United States Patent
Ankalikar et al.

(10) Patent No.: US 11,829,779 B2
(45) Date of Patent: Nov. 28, 2023

(54) SCALABLE SPECIFICATION AND SELF-GOVERNANCE FOR AUTONOMOUS DATABASES, CLUSTER DATABASES AND MULTI-TENANT DATABASES IN CLOUD AND ON-PREM ENVIRONMENT

(71) Applicant: Oracle International Corporation, Redwood Shores, CA (US)

(72) Inventors: Rohan Ankalikar, Sunnyvale, CA (US); Nagarajan Muthukrishnan, San Ramon, CA (US); Ravi Shankar Thammaiah, Redwood City, CA (US); Sandeep Kumar Samudrala, Bengaluru (IN)

(73) Assignee: Oracle International Corporation, Redwood Shores (CA)

( * ) Notice: Subject to any disclaimer, the term of this patent is extended or adjusted under 35 U.S.C. 154(b) by 229 days.

(21) Appl. No.: 17/365,577

(22) Filed: Jul. 1, 2021

(65) Prior Publication Data

US 2023/0004402 A1 Jan. 5, 2023

(51) Int. Cl.
*G06F 9/44* (2018.01)
*G06F 9/445* (2018.01)
*G06F 16/23* (2019.01)

(52) U.S. Cl.
CPC ...... *G06F 9/44505* (2013.01); *G06F 16/2365* (2019.01)

(58) Field of Classification Search
CPC ............ G06F 1/32; G06F 9/44; G06F 1/12
See application file for complete search history.

(56) References Cited

U.S. PATENT DOCUMENTS

| | | | |
|---|---|---|---|
| 7,457,853 B1* | 11/2008 | Chari | H04L 67/125 709/219 |
| 2014/0187993 A1* | 7/2014 | Contestabile | G01N 33/4972 600/532 |
| 2018/0007175 A1* | 1/2018 | Tischart | H04L 63/08 |

OTHER PUBLICATIONS

Van Aken, D., et al., "Automatic Database Management System Tuning Through Large-scale Machine Learning," SIGMOD'17, May 14-19, 2017, Chicago, IL, USA, Copyright 2017.

* cited by examiner

*Primary Examiner* — Keshab R Pandey
(74) *Attorney, Agent, or Firm* — Vista IP Law Group, LLP

(57) ABSTRACT

A computer program product, system, and computer implemented method for scalable specification and self-governance for autonomous databases, cluster databases, and multi-tenant databases in cloud and on-prem environments. The approach disclosed herein enables management of a consolidated databases using a template-based process that allows for the consolidated databases (CDBs) and pluggable databases (PBDs) to be reconfigured automatically. In some embodiments, the approach instantiates one or more monitoring modules and one or more CDB/PDB configuration managers. These elements can detect relevant changes in the conditions in which CDB instances and open PDBs operate and adjust the configurations thereof in response. The configurations are specified in and adjusted using one or more corresponding templates, where the template comprise a set of rules that may have various interdependencies and specify how to determine what value a particular configuration setting should be to automatically configuration and reconfigure CDB instances and open PDBs.

24 Claims, 16 Drawing Sheets

SCALABLE SPECIFICATION AND SELF-GOVERNANCE FOR AUTONOMOUS DATABASES, CLUSTER DATABASES AND MULTI-TENANT DATABASES IN CLOUD AND ON-PREM ENVIRONMENT

BACKGROUND

Modern computing systems handle large amounts of data. For single user/device data storage systems this often corresponds to gigabytes and even terabytes of data. However, in the context of network environments, such as in a cluster, where multiple users or services are provided, the amount of data to be managed is often in the order of petabytes of data, or more, some of which may be shared by multiple users or used to provide services to multiple users. Unfortunately, the systems designed for individual users simply are not capable of efficiently handling the amount of data in these network environments.

One current approach to address the needs of network systems is to use pluggable databases such as in a consolidated database. This solves the problem of data management to a certain extent by allowing different pluggable databases to be open as needed in a consolidated database instance and even allows multiple users/services to operate on that data concurrently by allowing the same pluggable database to be open in multiple consolidated database instances at the same time. However, the use of consolidated databases presents another challenge in managing those consolidated databases.

Because consolidated databases often have hundreds if not thousands of configuration settings, manually managing these configurations can be difficult—such as to manage allocation of resources to different consolidated database instances. Additionally, each pluggable database that is open in each respective consolidated database can also have additional configuration settings that might, or might not, be specific for a particular pluggable database or be for all pluggable databases open in a given consolidated database. Another issue is that some configurations can be effected by runtime conditions further complicating matters.

Therefore, there is a need for an improved approach to manage consolidated databases in a cluster having shared resources.

SUMMARY

Embodiments of the present disclosure provide a method, apparatus, and product for scalable specification and self-governance for autonomous databases, cluster databases, and multi-tenant databases in cloud and on-prem environment.

The approach disclosed herein generally comprises management of consolidated databases using a template-based process that allows for the consolidated databases and pluggable databases to be reconfigured automatically. In some embodiments, the approach instantiates one or more monitoring modules and one or more configuration managers. These elements can detect relevant changes in the conditions in which they are operating and adjust the configurations thereof in response. The configurations are specified in and adjusted using one or more corresponding templates, where the template comprises a set of rules that may have various interdependencies and specify how to determine what value any particular configuration setting should be. In this way the approach provided herein enables template based automatic configuration and management of consolidated databased instances and pluggable databases where changes to dependent configuration parameters can be cascaded across one or more configuration templates.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

DETAILED DESCRIPTION OF THE EMBODIMENTS OF THE DISCLOSURE

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Figure 1:
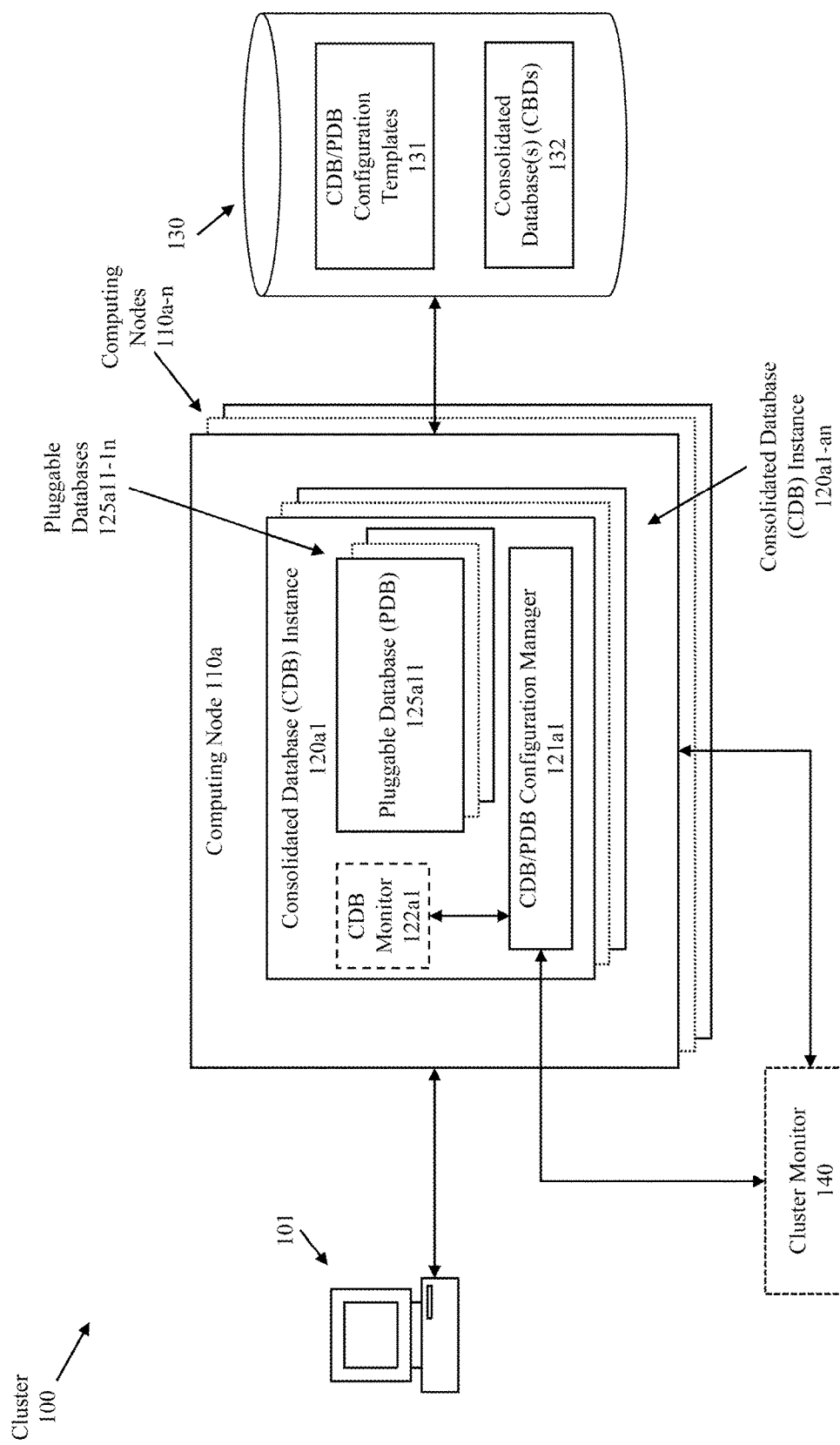
FIG. 1 illustrates an example system in which some embodiments of the disclosure are implemented.

FIG. 1 illustrates an example system in which some embodiments of the disclosure are implemented. Generally, the system includes one or more computing nodes that might each have one or more consolidated database (CDB) instances and one or more pluggable databases (PDBs) that may be open in the consolidated database instance at any given time. Each CDB instance and PDB instance in a respective consolidated database instance might have a configuration that is to be managed by a configuration manager in concert with a cluster and/or CDB monitors.

The system comprises a cluster 100 that may include a computer device 101, computing nodes 110a-n, database 130, and a cluster manager 140. Each computing node 110a-n might comprise one or more consolidated database instances—such as consolidated databases 120a1-an as illustrated for computing node 110a—which might in turn have one or more pluggable databases (PDBs) open at any given time (see e.g., 125a11-1n).

The computing device 101 interacts with consolidated database (CDB) instance(s) on respective nodes of the computing nodes 110a-n (e.g., 110a1-an on computing node 110a) to control corresponding consolidated databases by leveraging a CDB/PDB configuration manager (see e.g., 121a1). Furthermore, the computing devices might be controlled by a user, another service, an administrator, or comprise any other computing device that allows data access or management of a CDB/PDB or an element therein. Any CDB instance can contain multiple PDBs and each CDB instance may have one or more open PDBs at any given time where the PDBs that are open may or may not overlap with PDBs open in another CDB instance. A PDB itself is essentially a set of metadata and data where the metadata describes a schema, schema objects, and nonschema objects that can be presented on a network as a separate database. In some embodiments, one or more of the consolidated database instances (e.g., 120a1) comprises a container database or a collection of containers. In some embodiments, one or more of the PDBs comprise containers (e.g., partitions or virtual disks), which may be defined by a class, data structure, or an abstract data type. In some embodiments, the PDBs may comprise a container equivalent.

The computing device 101 comprises any type of computing device that may be used to operate or interface with the CDB instance, whether directly or indirectly. Examples of such user computing devices 101 include workstations, personal computers, laptop computers, or remote computing terminals. User computing devices 101 may also comprise any type of portable tablet device, including for example, tablet computers, and portable readers. User computing device 101 may also include mobile telephone devices relating to any mobile device that can suitably access any computing systems on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, or on a cloud network.

In some embodiments, the database 130 includes CDB/PDB configuration templates 131 and the CDBs (and the corresponding PDBs) 132. In particular, database 130 includes the current pluggable databases (PDBs) representing committed transactions (see e.g., 132). Additionally, as illustrated here, database 130 includes CDB/PDB configuration templates 131 which as will be discussed below are used to instantiate a CDB instance, and possibly open a PDB, to define how that CDB is to be configured, and in some embodiments reconfigured, according to a schema defined therein.

As illustrated here, a CDB instance (e.g., 120a1) might comprise a CDB/PDB configuration manager 121a1, a CDB monitor 122a1, and one or more open/openable pluggable databases (e.g., 125a1-an) which comprise data containers for user/customer/tenant data.

The CDB/PDB configuration manager (e.g., 121a1) manages the configuration applied to the parent CDB instance (e.g., 120a1) using the CDB/PDB configuration templates 131. For example, an initial configuration might be provided by an external CDB instantiation module or instantiated with a set of default parameters based one or more corresponding templates. Subsequently, the CDB/PDB configuration manager 121a1 might identify a trigger that causes a re-evaluation/update to the configuration parameters for the CDB instance and/or one or more PDBs that might be open or openable on the CDB instance based on the one or more corresponding templates. Some example configuration parameters comprise allocations of CPU, memory, I/O, process count, and other processing (resource parameters) which may be based on database or system resources, feature parameters (enabled or disabled), or number of cursors allocated to the each PDB. As will be discussed further below, this process can be implemented using the configuration templates 131 to determine the values of various configuration parameters to be specified for respective CDBs/PDBs. Briefly, the templates provide one or more rules for specifying the configuration parameters to be applied to respective CDB/PDB instances based on currently available status of the computing node (e.g., available resources for CDB/PDB instances, number of CDB instances currently instantiated, number of PDBs open etc.). Additionally, one or more parameters may depend on one or more configuration parameters within the same template which may then be depended on by other configuration parameters, and so on. Because of this, one change in a status parameter might correspond to multiple changes in configuration parameters which may then correspond to additional changes in configuration parameters that depend on at least those modified configuration parameters. Additionally, opening a PDB can also cause changes to other PDBs determined using said templates, such as to reapportion resources to the then open PDBs.

The CDB monitor (e.g., 122a1) can monitor the CDB instance and the computing node on which it is executing. In some embodiments, the CDB monitors form a cluster of CDB monitor aware modules to facilitate the examiner of status information. For example, the CDB monitor can identify changes to the number of CDB instances currently operating on the node, the number of PDBs open in the corresponding CDB instance, and/or changes in the resources that can be allocated to CDB processes. In the event that the CDB monitor detects a change relevant to one or more rules in the configuration template, the CDB monitor can notify the CDB/PDB configuration manager (e.g., 121a1) which may cause a reconfiguration of the CDB instance, and may cause a redistribution of resources to PDB instances within that CDB instance, and/or the instantiation or closure of a CDB instance on the same computing node (causing redistribution of resources between CDB instances on the same computing node having a cascaded effect of redistribution of resources PDBs open on different CDB instances on the computing node). In some embodiments, the illustrative example might be caused by a change in the allocation of resources to a corresponding host.

The CDB monitors and CDB/PDB configuration managers might cooperate to address various changes in conditions such as changes to allocated resources of/to a computing node. For example, the CDB monitor can detect and notify the CDB/PDB configuration manager of relevant changes such as a deallocation of resources (e.g., the CDB instance is in a virtual machine that experience a decrease in available resources due to component failure or configuration setting change), a role of the computing node or CDB instance changes between to or from a standby role (standby CDB instances normally do not need as much resources as CDB instances associated with a primary role), and/or the opening of additional PDBs (causing the redistribution of resources between the PDBs currently open within a CDB instance), In some embodiments, a cluster monitor 140 is provided to monitor the cluster for events regarding the CDB instances. For example, the cluster might be monitored to identify any computing node failures and to generate a corresponding notification to cluster managers in surviving nodes when a computing node fails. As a result of the notification, a cluster manager might cause a reconfiguration of a CDB instance to, for instance, service user requests to one or more PDBs previously open on a failed node. This reconfiguration may require additional allocation of resources to a CDB opening additional PDBs (e.g., PDBs from the failed node) and a removal or decrease of an allocation of the same resource to other CDB instances and/or open PDBs on the same computing node. In this way, the resources of the CDB instances and their corresponding PDBs can be automatically managed according to a schema in the corresponding template.

Like CDB monitors and the CDB/PDB configuration managers, cluster monitors can also interact with CDB/PDB configuration managers. However, whereas the CDB monitor normally interacts with a single CDB/PDB configuration manager to address changes that arise at the level of the computing node, the cluster monitor interacts with multiple configuration managers to address changes that occur at the cluster level outside of the computing node. The cluster monitor can detect and notify multiple CDB/PDB configuration managers when a relevant change occurs (e.g., by processing an event to determine whether it corresponds to a status parameter change based on analysis of a corresponding template). For example, a cluster monitor might detect a network failure, a new node in the cluster, and/or a failure of a storage appliance.

Figure 2:
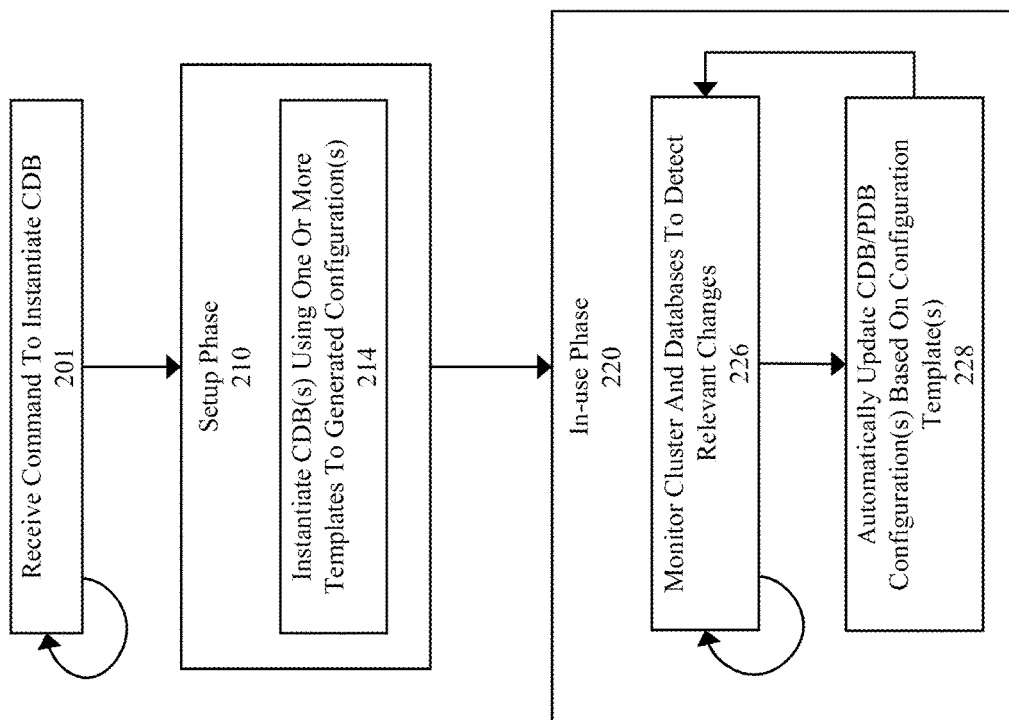
FIG. 2 is a flowchart for management of consolidated database configurations according to some embodiments.

FIG. 2 is a flowchart for management of consolidated database configurations according to some embodiments. Generally, the process includes two types of activities, setup operations, and operations during use. In some embodiments, the setup operations capture the current conditions at the node where a CDB instance is to be deployed and generates a configuration for said CDB. In some embodiments, the in-use operations capture changes to the operating conditions and automatically update corresponding CDB/PDB configurations in response. As will be discussed further below, this can comprise operations on the computing node at which the CDB is to be deployed or it might comprise operations executed elsewhere to provide an initial configuration or updated configuration during runtime.

Generally, the process starts when a first command is received to instantiate a CDB instance at 201. A user might try to access data in a particular PDB of a CDB instance and a command is generated in response to cause the instantiation of the corresponding CDB. An administrator might send a command to instantiate a CDB instance to service client/user requests. A process might generate a CDB instantiation command as part of setting up a new tenant or user in a cluster. In some embodiments, a command to instantiate a CDB is generated during a recovery process to restore a cluster or computing node state. Regardless of what causes the command to be issued, its receipt will trigger the setup phase 210. Additionally, each time such a command is received the operations discussed below to instantiate a CDB will be executed. Thus, multiple different CDB instances can be created.

The setup phase 210, causes the instantiation of a CDB instance. In some embodiment, the CDB instance is instantiated using a set of status parameters that are based on then current conditions within the cluster. For the purposes of this Application, status parameters are parameters regarding the state of the computing node or cluster including any of CPUs, memory, I/O capacity, number of CDB instances, number of PDBs open, etc. For instance, a set of status data that is accessible via a communications path is retrieved. Once retrieved, one or more CDB/PDB configuration templates (see e.g., 131) are processed using those retrieved status parameters to determine the value(s) of configuration parameters that occur within a CDB/PDB configuration template (see e.g., 131), which are then used to generate a set of configuration settings/values used for initial deployment (see e.g., 214), including multiple layers of dependencies therein.

During the in-use phase 220 a CDB instance performs database operations to service user requests, and thus consume cluster resources—e.g., processing cycles/cores, temporary memory space, communications bandwidth, I/O operations bandwidth, etc. However, various conditions might change at any given time. Thus, a monitoring function is provided which can detect these changes (see 226) and cause the automatic update of corresponding CDB/PDB configurations based on the corresponding configuration templates (see 228). In some embodiments, the monitoring function might detect instantiation and closing of CDB instances, opening/closing of PDBs, or changes in available resources.

Template File Construction/Contents:

There are numerous configuration parameters that could be used to define a template. Those configuration parameters could comprise various different types (e.g., integer, boolean, string, and file). Various different options could be supported (e.g., options like—static/dynamic, flags, and callbacks) some of which may depend on the existence of other options (e.g., other characteristics like system and session modifiable). Some options could be provided to alter default or inherited configuration parameters such as for a PDB that inherits a configuration parameter from the CDB instance that opens it or from a default/base PDB configuration (e.g., alter options might specify a container, scope, or a system ID to be altered). The template file itself might be stored with various different identifiers identifying a file format (e.g., pfile or spfile), and the template file might be storage a different locations such as a data dictionary.

The various configuration parameters for a CDB instance and one or more PDBs might comprise any combination of resource configuration parameters, decision configuration parameters, and path configuration parameters. The configuration parameters themselves might be arranged in a hierarchy that comprises multiple levels. For example, any configuration parameter may depend on another, which may in turn depended on yet another configuration parameter. Additionally, each configuration parameter may depend on multiple status parameters, whether alone or in combination with one or more configuration parameters. As a result, any status change may result in one or more configuration parameter changes which may by cascaded through a template file. Additionally, the expressions provided herein can be applied to a running CDB instance and/or open PDB or can be applied to a configuration file to take effect at a later time such as after a restart of the CDB instance or opening of a PDB.

Those parameters can be used in different expressions to define the set of configuration parameters. Different operations might be supported such as numeric operators (e.g., +, −, *, /, %, $), groups identified using parentheses, minimum/ maximum operations, ceil and/or floor functions, ternary operations (e.g., A?B:C for example db_block_checksum= (@ROLE=="primary")?"full":"medium"). Some operations might only be called during startup. Some configuration parameters might specify dependencies on computing systems or the environment thereof. In some embodiments the configuration files may be maintained elsewhere and accessed using a URL. In some embodiments, the configuration file comprises a JSON or XML file. The configuration parameters themselves can be used as operands (e.g., session=processes*2). Additionally, system configuration values or instance variables could be specified using a special character (e.g., @), such as to define a configuration parameter based on a system configuration values—also called status parameters herein—(e.g., sga_target=@HOST_MEMORY*0.4).

Commands that cause the template file to generate a configuration to be used might comprise static commands such as startup using spfile, startup using server side pfile, create spfile from pfile, or create pfile from spfile, whereas dynamic commands might effect a change to a running CDB instance or an open PDB.

For example, parameter file entries (e.g., in a Init$ORACLE_SID.ora file) might comprise the following:
  Sessions=processes+cpu_count*2;
  PARALLEL_MAX_SERVERS=MAX (100, MIN (PROCESSES, 40);
  max_io_slaves=cpu_count;
  cpu_count=@HOST_CPU/$active_instance;
  whereas parameter file entries in a different file (e.g., in a Spfile$ORACLE_SID.ora file) might comprise the following:
  *.sessions=(processes+(cpu_count*2))
  *.parallel_max_servers=MAX (100, MIN (PROCESSES, 40))
  max_io_slaves=cpu_count
  *.cpu_count=(@{HOST_CPU}/${active_instance})

Figure 3:
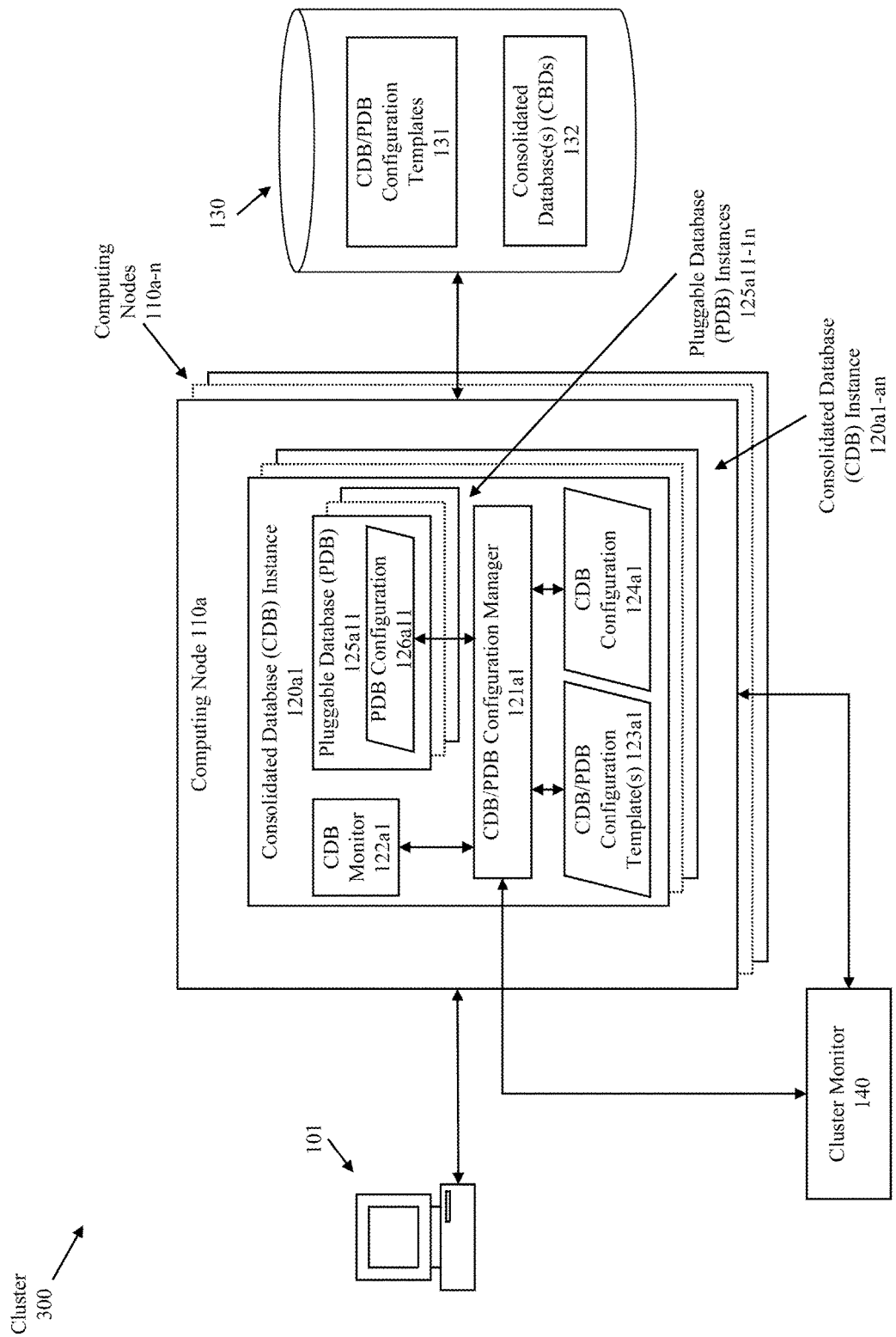
FIG. 3 is a second example system in which some embodiments of the disclosure are implemented.

During the in-use phase, the modification of configuration parameters can be applied dynamically to alter a running CDB instance and/or an open PDB. For example, alter commands might comprise any of the following:
  Alter system set sessions='cpu_count*2';
  Alter session set parallel_max_servers='max (100, processes/40)';
  Alter system set "max_io_slaves"='cpu_count' sid='remote_sid';
  Alter system set cpu_count='@host_cpu/$active_instances';

Some other expressions might comprise any of the following:
  SGA_MAX_SIZE=@HOST_CPU*8 GB;
  Sid1.sga_max_size=@HOST_CPU*4 GB;
  Sid2.sga_max_size=@HOST_CPU*2 GB;
  Sga_max_size=(@sid='sid1'?4 GB:2 GB)*@HOST_CPU;
  CPU_COUNT=<customer configured value>/@NUMBER_OF_ACTIVE_INSTANCES;
  CPU_MIN=<customer configured value>/@NUMBER_OF_ACTIVE_INSTANCES;
  CPU_COUNT=CPU_MIN*BURSTING_FACTOR;
  SGA_TARGET=CPU_COUNT*4 GB;
  SGA_TARGET=@system_memory*CPU_COUNT/ @system_cpu_count*4 GB;
  PGA_AGGREGATE_TARGET=CPU_COUNT*3 GB;
  PGA_TARGET=40%*SGA_TARGET;

FIG. 3 is a second example system in which some embodiments of the disclosure are implemented. FIG. 3 is largely similar to FIG. 1 but with the changes as discussed herein. Where FIG. 3 uses reference numbers that are the same as those used in FIG. 1, the description provided therein is applicable in regard to FIG. 3 unless otherwise stated herein. Additionally, any of the aspects of FIG. 3 may be combined in any manner with aspects from any other embodiments disclosed herein.

Cluster 300 includes many of the same elements 101, 110*a-n*, 120*a*1*-an*, 121*a*1, 122*a*1, 125*a*11-1*n*, 130, 131, 132, and 140 found in FIG. 1. However, in addition to the elements from FIG. 1, FIG. 3 includes CDB/PDB configuration template(s) 123*a*1, CDB configuration 124*a*1, and PDB configuration 126*a*11.

The CDB/PDB configuration template(s) 123*a*1 comprises a copy of the corresponding CDB/PDB configuration templates 131 from database 130. The copy might be stored in memory of the CDB instance. This can be beneficial when a change in conditions occurs because it would avoid the need to then retrieve the configuration. Thus, changes in the conditions can be addressed more rapidly and efficiently.

The CDB/PDB configuration manager 121*a*1 processes the CDB/PDB configuration template(s) 123*a*1 in response to a notification of an event (from CDB monitor 122*a*1 or cluster monitor 140) that may affect one or more configuration parameters generated using the configuration template. For instance, the CDB monitor might generate an event indicating that a new CDB instance was instantiated at the computing node 110*a*. The configuration manager might then analyze the template to identify any configuration parameters that depend on a variable corresponding to the number of CDB instances on the computing node 110*a*. To illustrate, a computing node having ten processing cores and three CDB instances associated with a rule specifying that each CDB instance is to be assigned three processing cores if the number of cores divided by the number of CDB instances is equal to or greater than three, and if the number of cores divided by the number of CDB instances is less than three then each CDB instance is to be assigned the largest integer number of cores determined from the division. Thus, when the example computing node has three CDB instances and ten cores, each instance is assigned three cores. However, when the example computing node has four or five CDB instances each core is assigned only two cores. This configuration information, along with any other configuration information is then storage in the CDB configuration for each respective CDB instance (see e.g., 124*a*1).

In some embodiments, the resource allocations to a given PDB may be determined based on resources allocated to at least the CDB instance. For example, a CDB instance might comprise one of four CDB instances on a given computing node. Twenty percent of the memory of computing node 110*a* might be reserved for overhead on the computing node.

The remaining percentage (80%) might then be divided by the CDB instances equally. Then each CDB instance is allocated 20% of the available memory. The CDB instance then utilizes that memory for various functions, one of which might comprise the number of cursors allocated to each PDB instance. A rule that controls this allocation might specify that the number of available cursors be allocated evenly across the PDBs that are open. Thus, as the number of open PDBs change, so does their allocation of cursors, which is affected by updating the relevant configuration parameters in the corresponding PDB configuration files (see e.g., 126a1) and/or one or more alter commands.

Figure 4:
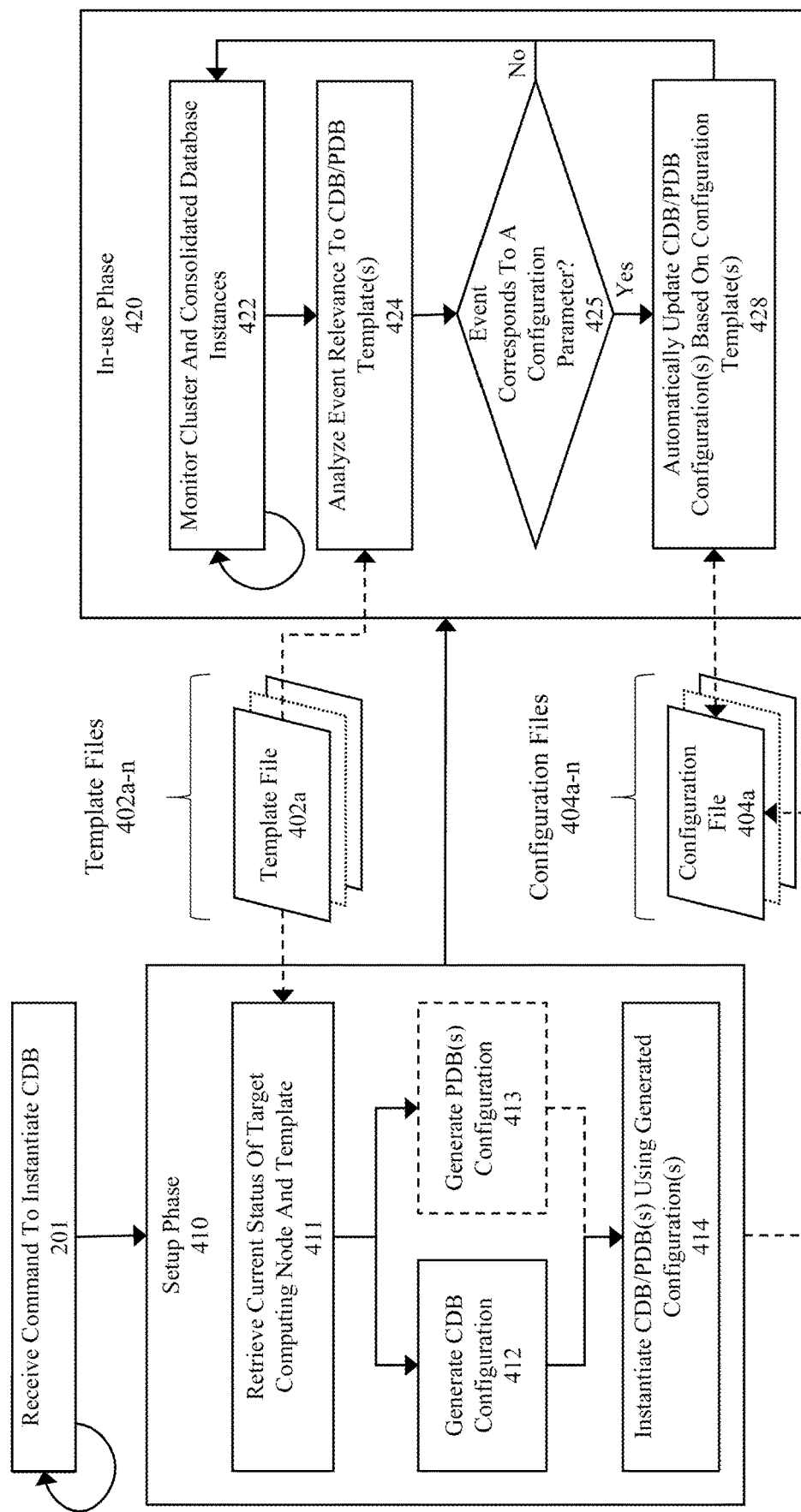
FIG. 4 is a more detailed flowchart for management of consolidated database configurations according to some embodiments.

FIG. 4 is a more detailed flowchart for management of consolidated database configurations according to some embodiments.

Generally, the setup phase 410 is triggered at 201 as discussed above. Once the setup phase 410 is triggered the process will retrieve the current status of a target computing node and a template corresponding to the command to instantiate the CDB at 411. For instance, a template file is read into memory for processing by a managing computing node (see e.g., 402a from 402a-n) and a shared memory space is read to retrieve current status information for the target node identified in the command to instantiate the CDB.

Using the retrieved information, the template file is processed to generate the relevant configuration parameters according to the rules therein and the retrieved status information at 412. In some embodiments, one or more PDB configurations—or a default PDB configuration—are generated at 413. For example, if the command to instantiate the CDB instance identified one or more PDBs to be opened at the CDB, the configurations for each PDB might be generated. In some embodiments, each PDB within the same instance will share the same configuration. In some embodiments, different PDBs, even within the same CDB instance, will have different configurations. In some embodiments, a default PDB configuration is provided for all PDBs within a CDB instance, and one or more parameters for respective PDBs are provide that may override the corresponding default PDB configuration parameters.

Once the configuration parameters are generated, they are combined into a configuration file (see e.g., configuration file 404a of configuration files 404a-n) and provided to a target computing node along with a command to instantiate the CDB instance in response to the received command discussed regarding 201 above.

The in-use phase 420 starts when a CDB instance is instantiated. During the in-use phase, one or more monitoring processes started to monitor the cluster and consolidated database instances at 422 might be used to detect the number of CDB instances open on a given computing node, to detect the number of CDB instances open across a cluster of computing nodes, to detect the number of PDB instances open on a given CDB instance, and to detect any changes in the numbers above, or to detect any changes to resources that the CDB instance or PDB instances therein rely on for functionality. If a change is detected an event notification is generated for analysis thereof regarding the CDB/PDB instances.

At 424 an event is analyzed to determine its relevance to any CDB/PDB templates. Generally, this comprises a determination as to whether the event corresponds to a change in a configuration parameter that is contained within a corresponding template file (see e.g., template file 402a)—for instance, the event causes a change in a status parameter that a configuration parameter is at least partly based on. If at 425 it is determined that the analysis identified one or more configuration parameters that are affected by the event the process continues to 428 where the corresponding configurations are automatically updated based on the configuration templates—e.g., by updating the corresponding configuration file, and/or by issuing an alter command that will cause the corresponding change to the configuration file and the associated consolidated database instance.

Figure 5:
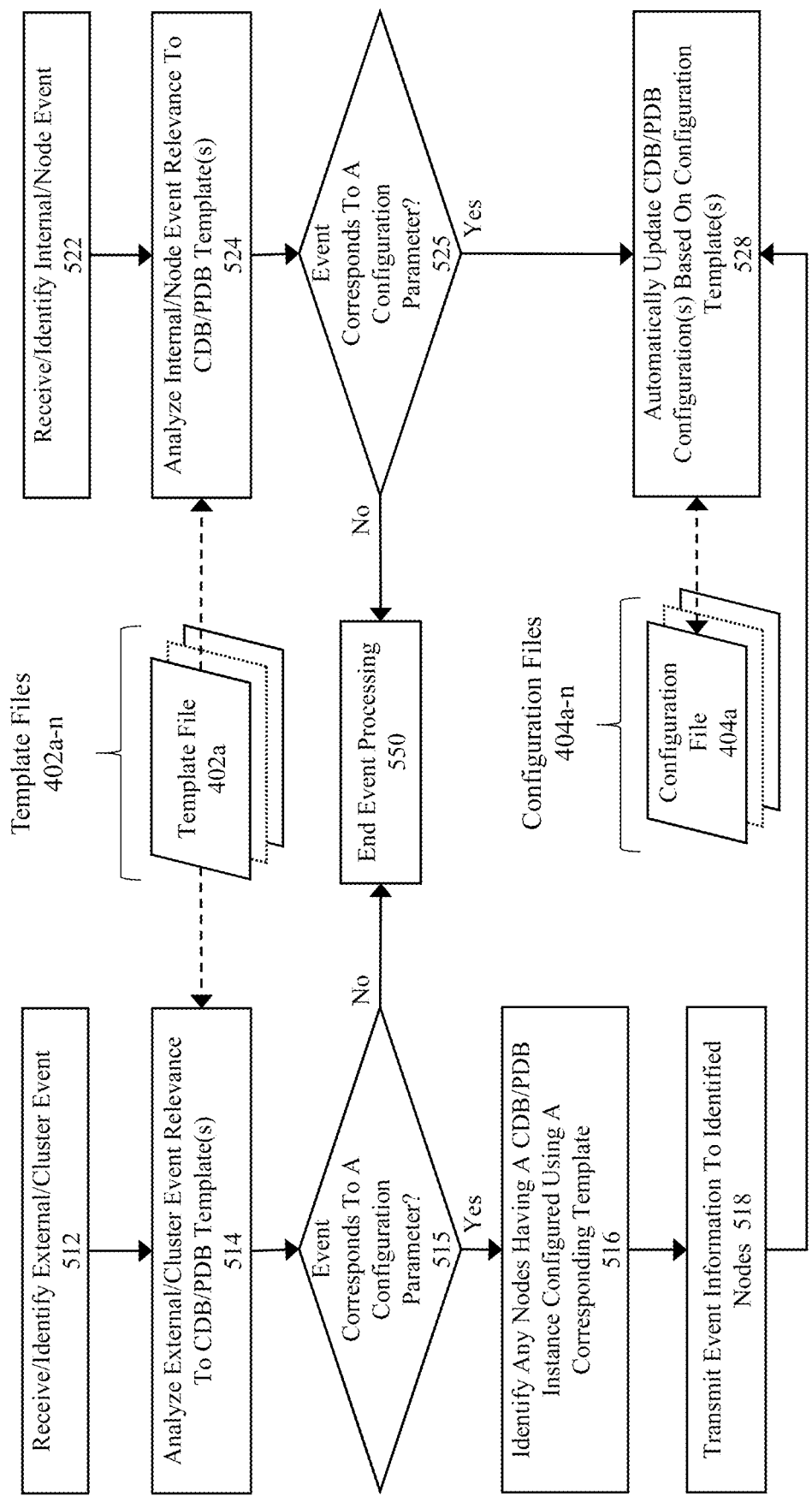
FIG. 5 is a more detailed flowchart for management of a consolidated database configurations during the in-use phase according to some embodiments.

FIG. 5 is a more detailed flowchart for management of consolidated database configurations during the in-use phase according to some embodiments. Specifically, FIG. 5 illustrates a flow that separately addresses external events and internal events.

An internal/node event is received or identified at 522. For example, an internal/node event might comprise the instantiation of a CDB instance on the same computing node as a monitoring process. The internal/node event is then analyzed to determine its relevance at 524 (as discussed above at 424) to a CDB instance or PDB that is currently open within a CDB instance. If the event is not relevant to any configuration parameters in the corresponding CDB/PDB template(s) (e.g., does not cause a change to a status parameter that one or more configuration parameters depend on) the processing for the event ends at 550 (see also 525 determining whether any relevance has been identified). If the event is relevant the process continues at 528 where the corresponding configuration is updated as discussed above in 428 and in further detail below.

In some embodiments, an external/cluster event is processed differently from an internal/node event in that an external/cluster event is analyzed to determine whether the external/cluster event is relevant to any CDB/PDB instances currently configured/open. For example, at 512 an external/cluster event is received or identified. In response to the receipt/identification of the external/cluster event, analysis is performed to determine the relevance of the external/cluster event to any of the CDB/PDB templates at 514 by analyzing each template to determine if any configuration parameter depends on a status parameter affected by the external/cluster event. If no relevant templates have been identified the event processing ends at 550 based on the determination at 515 that the event does not correspond to a configuration parameter in any of the relevant templates. However, if at 515 it is determined that the event is relevant to a configuration parameter, the process continues at 516 where any computing nodes having a CDB/PDB instance configured according to a corresponding template are identified. If any corresponding computing nodes are identified, event information identifying the event, and in some embodiments the relevant parameters within the template, is sent to the corresponding nodes at 518, where it can be processed at 528 as discussed herein. In some embodiments, the cluster monitor merely identifies an event as corresponding to a status parameter that is potentially or actually relevant to any of the configuration templates and sends a corresponding event notification to all CDB/PDB managers to be processed locally at the computing node with a corresponding CDB instance or open PDB.

Figure 6:
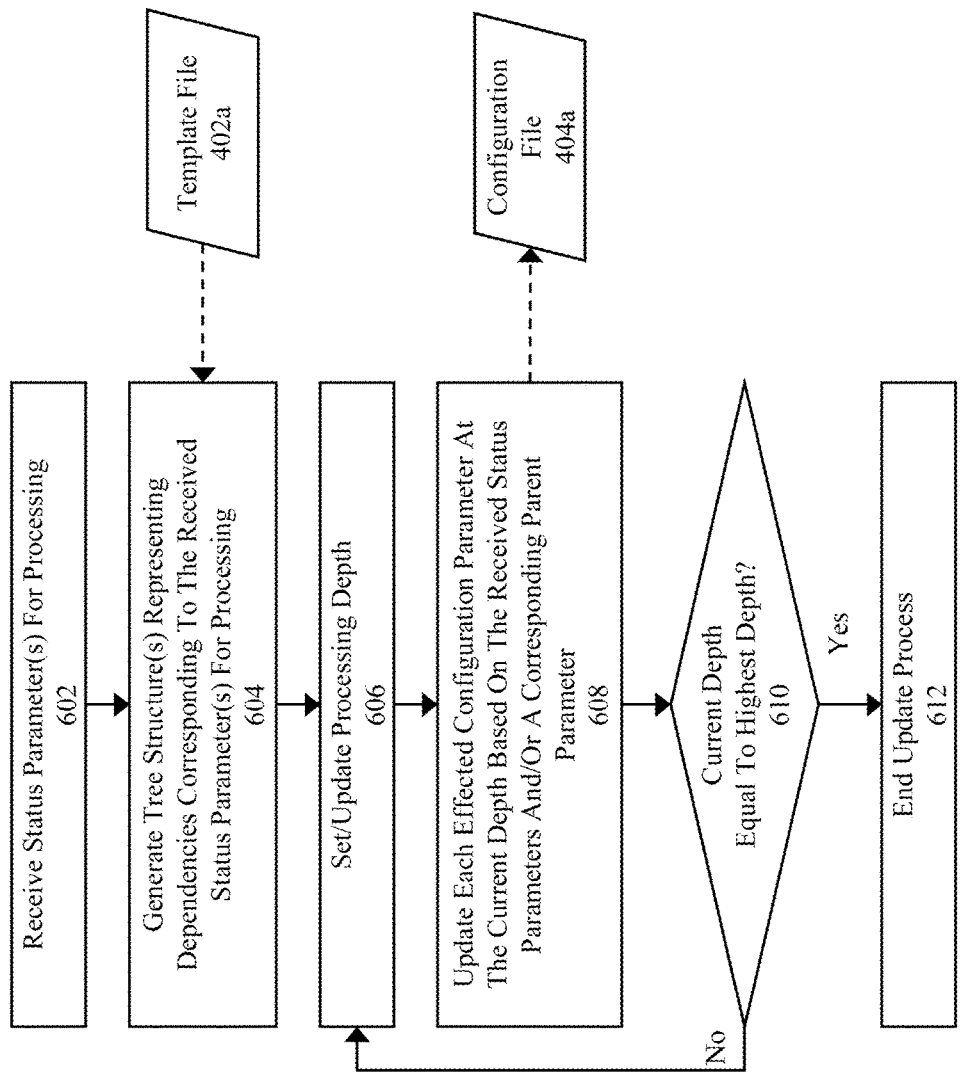
FIG. 6 illustrates an approach to automatically update CDB/PDB configurations based on a configuration template according to some embodiments.

FIG. 6 illustrates an approach to automatically update CDB/PDB configurations based on a configuration template according to some embodiments. The approach illustrated herein is only one approach and different approaches could be utilized including variations on the order of operations provided herein.

Generally, the process starts at 602 where one or more status parameters are received for processing. For example, the status parameters might comprise a set of status parameters that changed as a result of a corresponding event.

After the status parameters are received, the process continues at 604 where one or more tree structures are generated that represent the dependencies corresponding to the received status parameters based on a corresponding template file (e.g., 402*a*). For example, each configuration parameter that either directly or indirectly depends on any of the received status parameter(s) is identified in the tree structure with depths corresponding to the number of other configuration parameters that are needed in order to compute a particular configuration parameter (e.g., the number of levels of dependence of one configuration parameter on another configuration parameter). In this way, children of a parent parameter are logically deeper within the tree structure. The depth is utilized ensure that the parent configuration parameters are determined before a corresponding child configuration parameter.

Subsequently, an initial depth is set at 606 to begin processing the template file, where each configuration parameter that is affected at the current depth is determined and updated at 608. Each newly determined configuration parameter value is then stored in the configuration file 404*a*. A looping function is then controlled at 610 where a determination is made as to whether the current depth is equal to the highest depth of the tree structure. If the current depth is not equal to the highest depth, this indicates that there are additional levels in the tree to be processed. Thus, the process returns to 606 where the depth is incremented to the next level for processing at 608 and 610. If the current depth is equal to the highest depth, the tree structure has been fully traversed, and the update process ends at 612.

FIGS. 7A-7D illustrate an example flow to setup a consolidated database according to some embodiments. The approach illustrated herein is only one possible approach which utilizes a separate computing node to control the instantiation of a CDB instance on another node. For example, the computing node could be instantiated in the same or a similar manner by the target node itself. Another approach might comprise, instantiating the CDB instance using a default configuration with an immediate parameter retrieval operation(s) and reconfiguration process to meet current conditions.

Figure 7A:
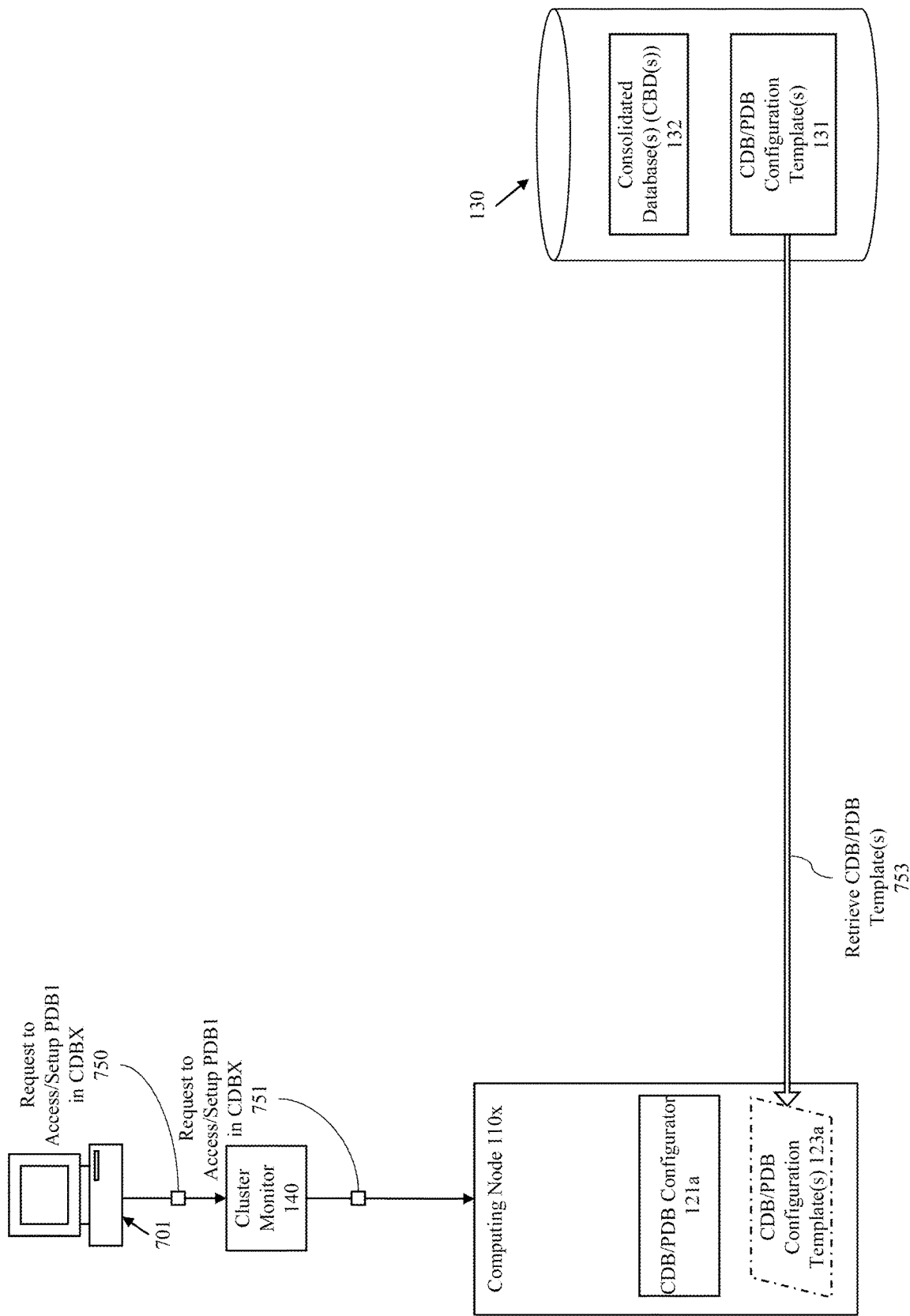
FIGS. 7A-7D illustrate an example flow to setup a consolidated database according to some embodiments.

FIG. 7A illustrates receipt of a request from a user to access/setup a PDB instance in a CDB, and a cluster monitor routing an event to a computing node that will setup the CDB instance. Determination of which node to target for the instantiation could be accomplished by retrieving information corresponding to an ability of a computing node or multiple computing nodes to provide resources to the CDB instance (e.g., a target computing node might be selected based on determining that said target node has the best metric or collection thereof for available resources of the CPU, memory, storage, and latency for a client). Additionally, a CDB instance might be instantiate at the direction of a user before a particular PDB is to be accessed in contrast to the example provided here which is triggered by a request to access a PDB (PDB1) that is not open or openable in another CDB instance.

In this illustration, the process starts when a user station 701 transmits a request to access/setup PDB1 in CDBX at 750 in response to a user action at 701. The request 750 is received by a cluster monitor 140 that generates an event that encapsulates the request 750 which is transmitted to a managing computing node 110*x* (see 751).

As illustrated here, computing node 110*x* includes a CDB/PDB configurator 121*a* and retrieves a CDB/PDB template(s) from the database 130 at 131 and stores them at 123*a*. In some embodiments, the configuration templates are retrieved in response to the event received at 751. In some embodiments, the CDB/PDB configuration templates are retrieved in response to an assignment of the computing node 110*x* to manage initial instantiation of CDB/PDBs on respective computing nodes which may occur before receiving the request from the user. Additionally, the database 130 also includes the consolidated database(s) 132.

Figure 7B:
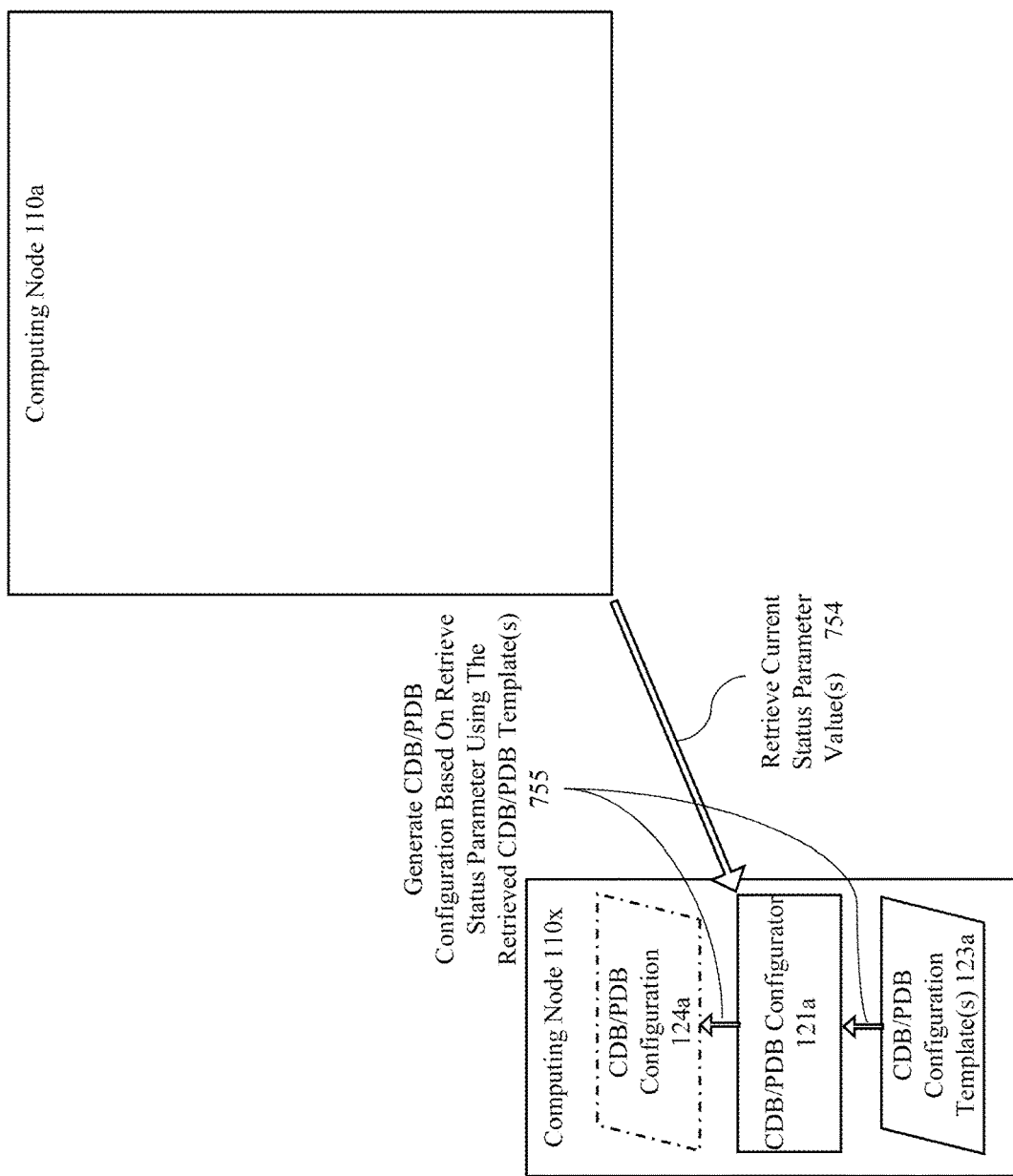

FIG. 7B illustrates the retrieval and processing of then current status parameters for the target computing node.

First, current status parameter values are retrieved for the target computing node 110*a* (see 754). Second, the status parameter values are then used at 755 to generate CDB/PDB configurations (see 124*a*) based on the retrieved status parameters using the CBD/PDB configuration templates 123*a* as discussed herein.

Figure 7C:
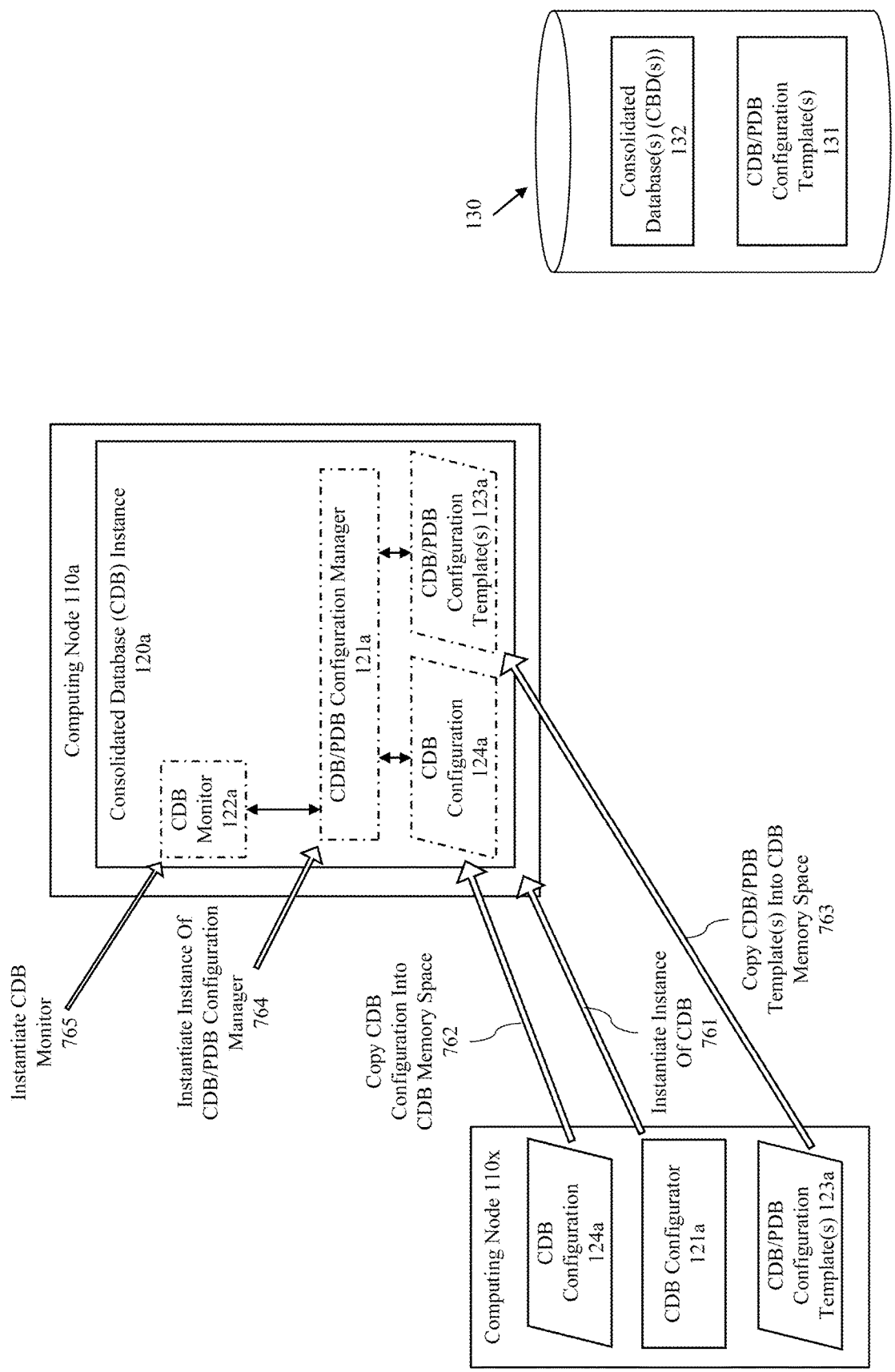

FIG. 7C illustrates the instantiation of the CDB and population of the instantiate CDB with relevant information and processes.

In particular, the instantiation process creates the CDB instance 120*a* at 761 having a copy of the CDB configuration (see 124*a* at 110*x* and 110*a*) in the CDB memory space (see also 762), a copy of the CDB/PDB template(s) (see 123*a* at 110*x* and 110*a*) in the CDB memory space (see 763), an instantiated instance of the CDB/PDB configuration manage 121*a* (see 764), and an instantiated CDB monitor 122*a* (see 765).

Figure 7D:
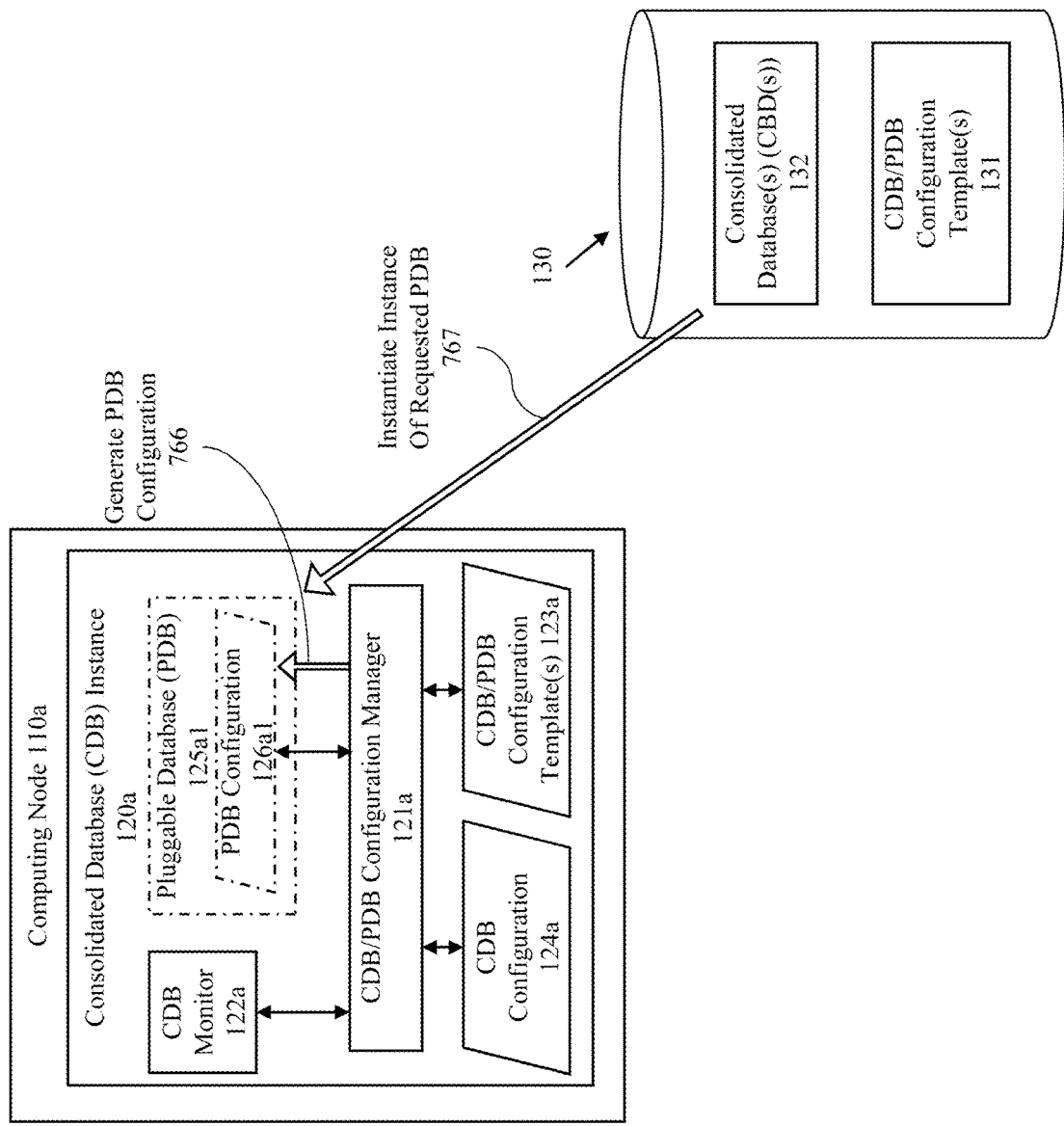

FIG. 7D illustrates the instantiation of the PDB and population of the instantiated PDB with a PDB configuration.

In particular, the instantiation process creates a PDB configuration 126*a*1 (see 766) and opens the PDB 125*a*1 within the CDB instance (see 767).

Figure 8A:
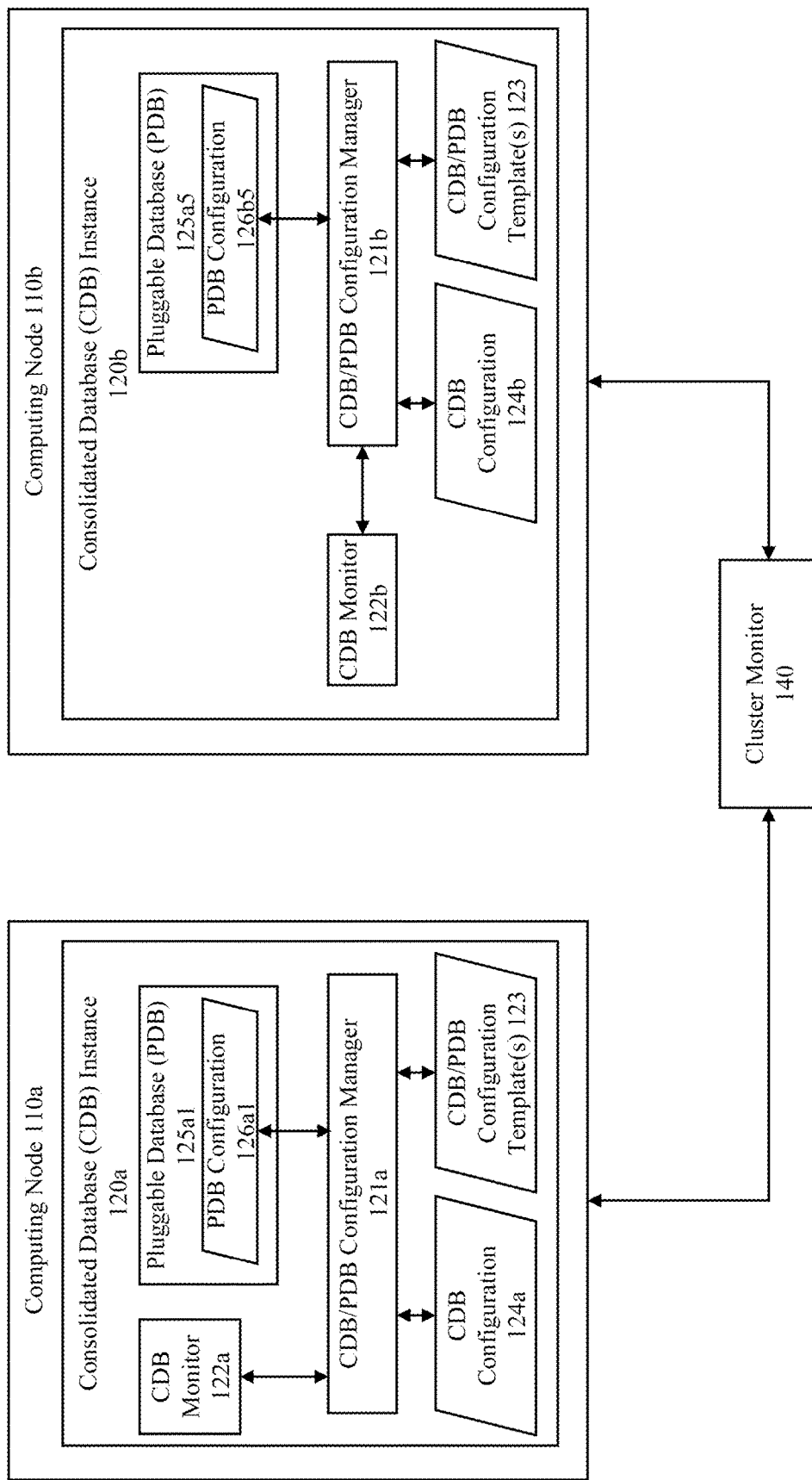
FIGS. 8A-8C illustrate an automated reconfiguration sequence in response to a node failure according to some embodiments.
Figure 8B:
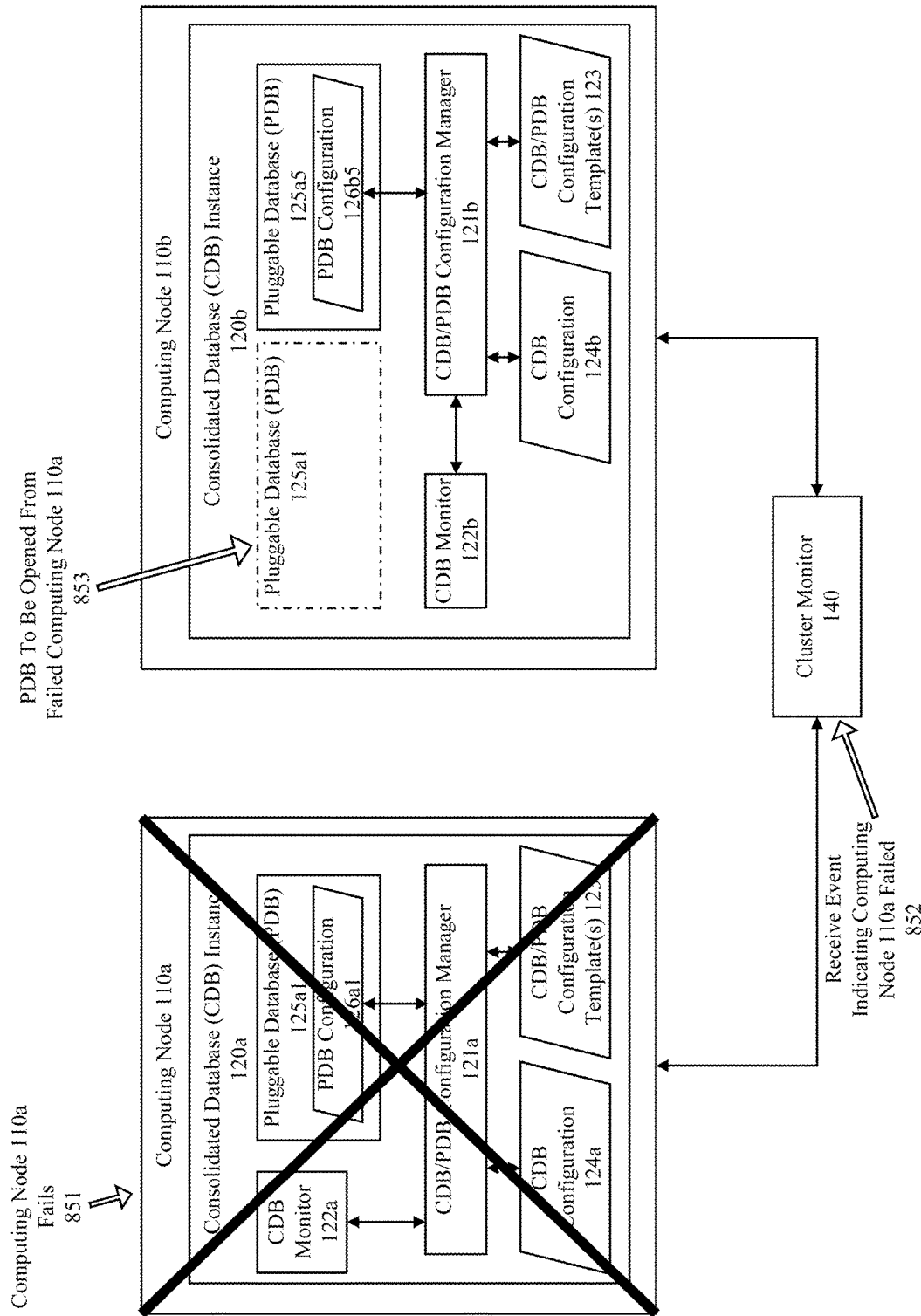
Figure 8C:
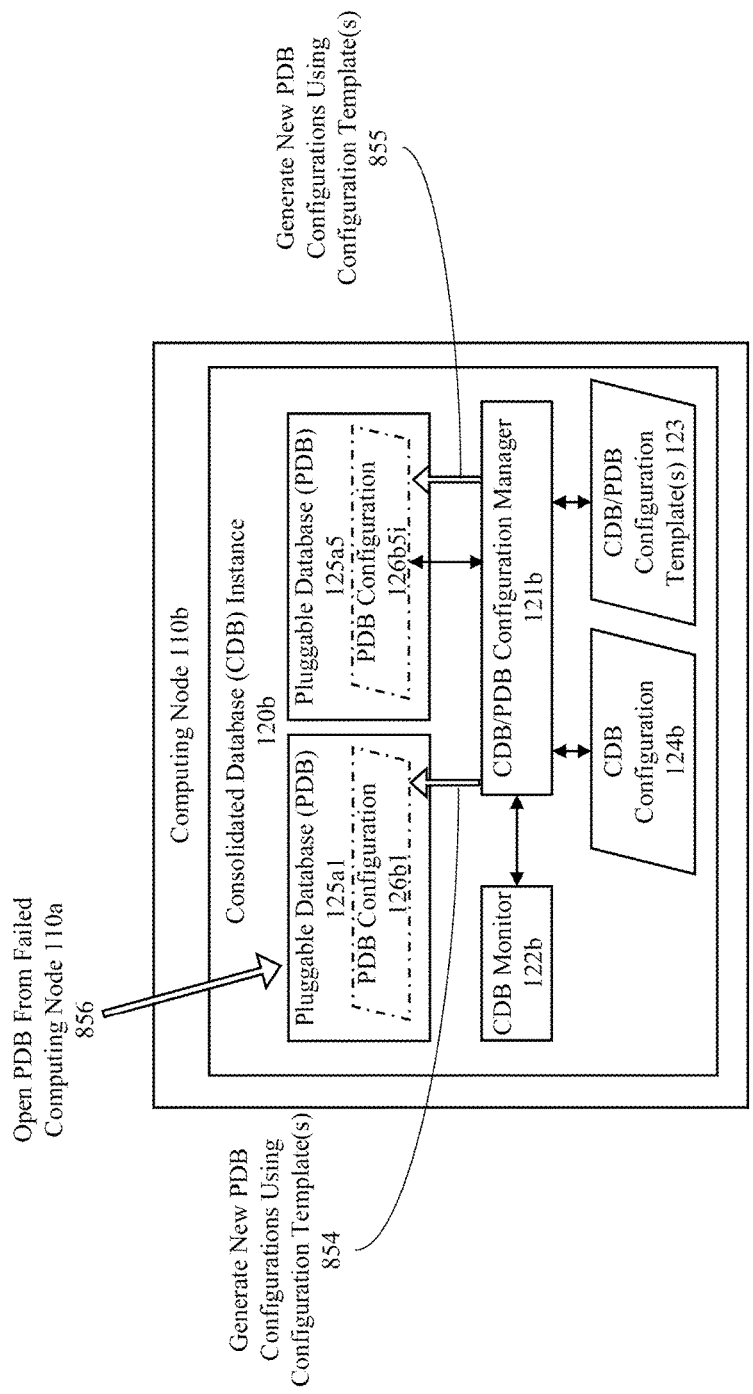

FIGS. 8A-8C illustrate an automated reconfiguration sequence in response to a node failure according to some embodiments.

FIG. 8A illustrates two different computing systems that both have different instances of a consolidated database and different open PDBs.

Computing node 110*a* has PDB 125*a*1 open in the CDB instance 120*a*, whereas computing node 110*b* has PDB 125*a*5 open in CDB instance 120*b*. PDB 125*a*1 has an associated configuration 126*a*1 previously generated by CDB/PDB configuration manager 121*a* using a corresponding configuration template from 123. The configuration for the CDB instance 120*a* is maintained at 124*a* and a CDB monitor 122*a* is operating at the computing node to detect any changes that might be relevant to the CDB instance 120*a*.

In this example, computing node 110*b* is similar to computing node 110*a* in that both computing nodes include a CDB instance (see 120*a* and 120*b*) with equivalent processes such as CDB monitor 122*a* and 122*b*, CDB/PDB configuration manager 121*a* and 121*b*. Additionally, CDB instance 120*b* also includes a CDB configuration 124*b*, and in this example the same configuration template(s) 123. Additionally, CDB instance 120*b* has a different open PDB (125*a*5) from the one open on computing node 110*a* (125*a*1), which is associated with its own configuration 126*b*5.

FIG. 8B illustrates the failure of a computing node and a recovery operation.

In particular, computing node 110*a* fails (see 851). This presents a problem for users of PDB 125*a*1 because that PDB was open on the now failed node. As illustrated here, the PDB is now to be opened at computing node 110*b* to recover from the failure. This might be triggered by the cluster monitor 140 after receiving an event indicating that computing node 110a has failed (see 852).

FIG. 8C illustrates the opening of PDB 125a1 at the computing node 110b.

In order to open PDB 125a1, the CDB/PDB configuration manager 121b generates a new PDB configuration 126b1 for PDB 125a1 based on the conditions at computing node 110b. Additionally, the CDB/PDB configuration manager 121b generates a new configuration 126b5i for the PDB that was already open in the CDB instance 120b (see 854 and 855). Once the PDB configuration 126b1 is generated the PDB from the failed computing node can be opened at computing node 110b (see 856).

Figure 9:
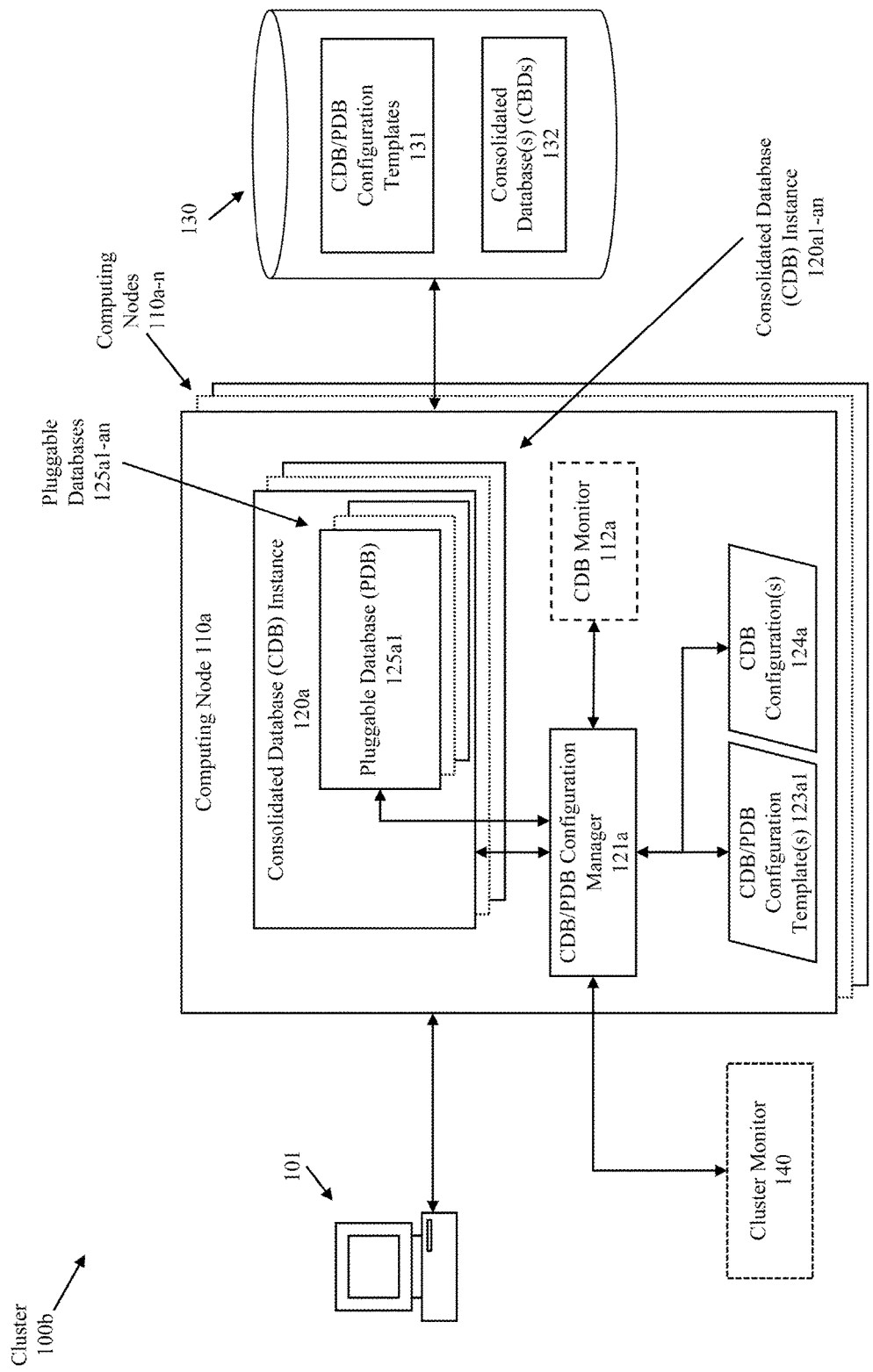
FIG. 9 is a third example system in which some embodiments of the disclosure are implemented.

FIG. 9 is a third example system in which some embodiments of the disclosure are implemented. The system illustrated here provides a shared management apparatus for a respective computing node. Additionally, any of the aspects of FIG. 9 may be combined in any manner with aspects from any other embodiments disclosed herein.

Here the elements of the computing node are essentially the same as discussed above in FIG. 3. However, instead of placing the CDB/PDB configuration manager 121a, CDB monitor 112a, CBD/PDB configuration templates 123a1, and the CDB configuration template(s) 124a in the CDB instance, they are placed at the level of the computing node and used for management of all CDB/PDB instances on that computing node.

System Architecture

Figure 10:
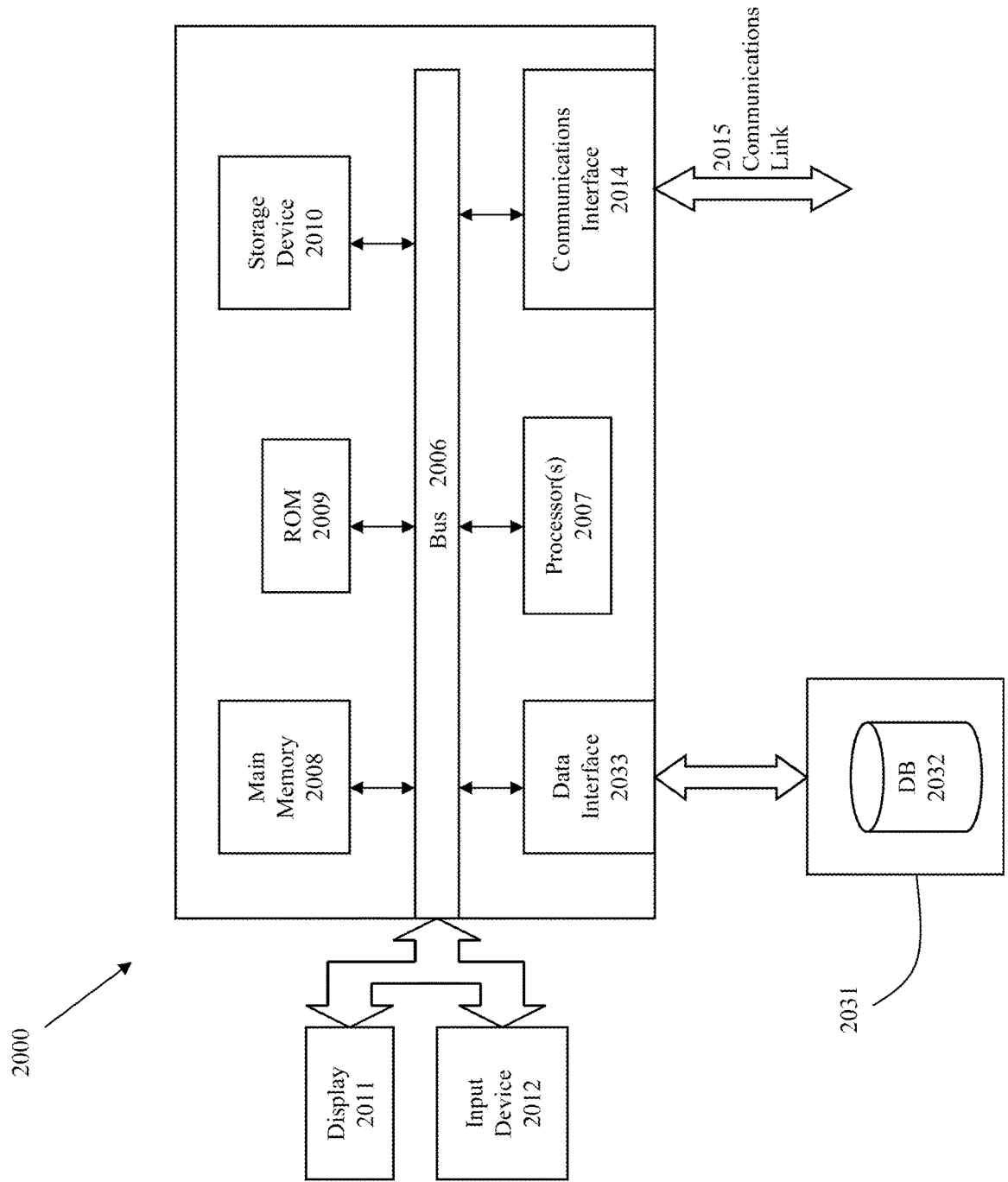
FIG. 10 is a diagram of a computing system suitable for implementing an embodiment of the present disclosure.
Figure 11:
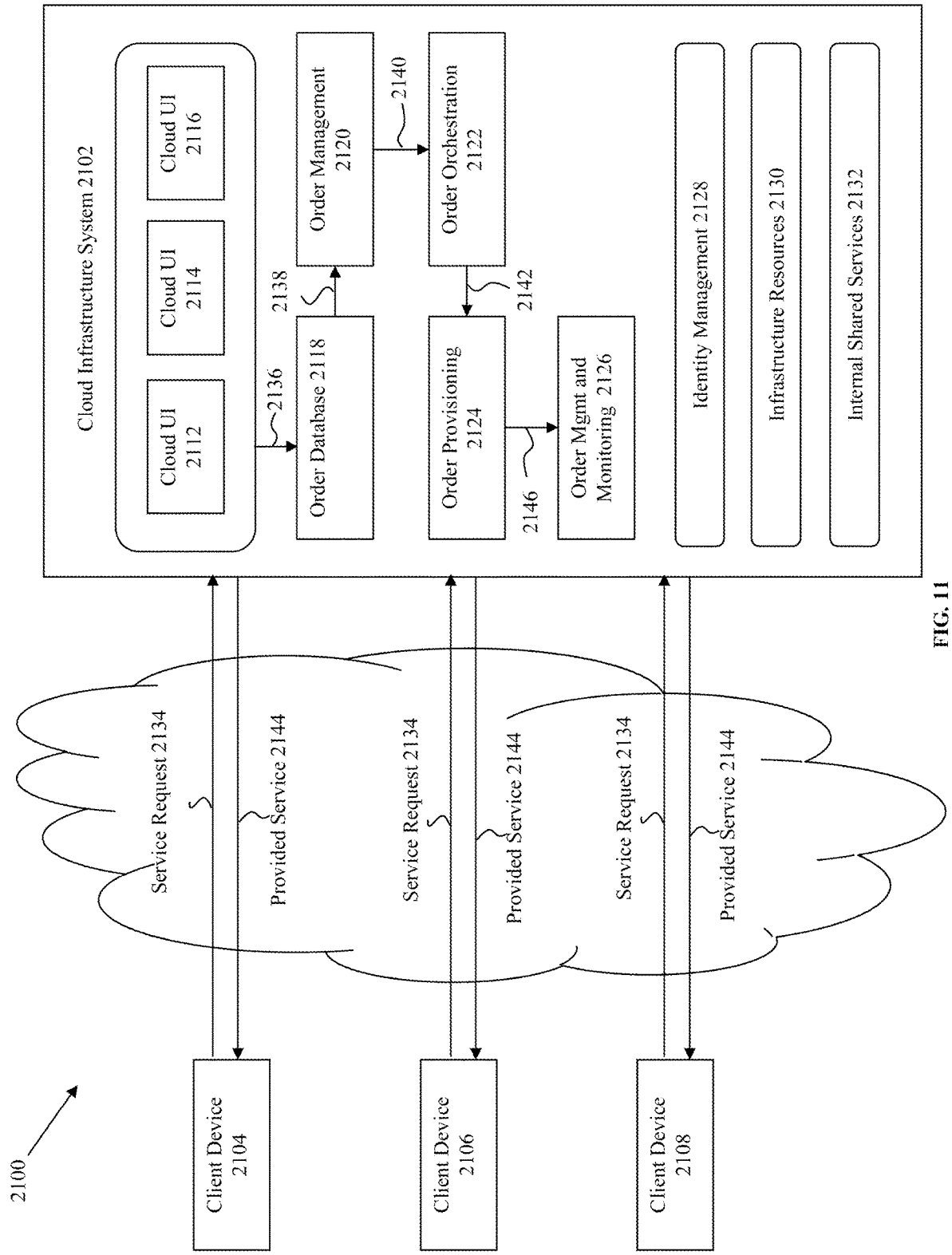
FIG. 11 is a block diagram of one or more components of a system environment in which services may be offered as cloud services, in accordance with an embodiment of the present invention.

FIG. 10 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

FIG. 10 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 7. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for scalable specification and self-governance for autonomous databases, cluster databases, and multi-tenant databases in cloud and on-prem environments addresses at least some of the issues of prior techniques suffer from, by alleviating the necessity to individually manage each CDB instance, and PDB configurations therein. This allows for the creation of configuration changes that can be affected essentially in real time. This at least improves the ability of the cluster to utilize the resources of the cluster at a peak level, at least because an administrator no longer has to configure CDB instances and open PDBs to leave as many resources as possible unused to allow for changing circumstances that might otherwise provision more resources then actually exist. In this way the approach provided herein enables improved and automatic configuration and management of CDB/PDB instances.

What is claimed is:

1. A computer-implemented method comprising:
maintaining a consolidated database instance on a computing node in a cluster of computing nodes, wherein the consolidated database instance was configured using a configuration template having one or more configuration parameters that depend on a status parameter representing a current state of the computing node;
monitoring the computing node to detect a change at the computing node that corresponds to a configuration parameter in the configuration template; and
automatically reconfiguring, in response to detecting the change at the computing node that corresponds to the configuration template, the consolidated database instance using the configuration template to regenerate the configuration parameter.

2. The method of claim 1, wherein the configuration template is used by a configuration management process to generate a consolidated database instance configuration.

3. The method of claim 2, wherein the configuration template is used by a configuration management process to generate a pluggable database configuration.

4. The method of claim 1, wherein monitoring the computing node to detect a change at the computing node that corresponds to the configuration template comprises parsing the configuration template to determine if a status parameter effected by the change corresponding to a configuration parameter that is in the configuration template.

5. The method of claim 1, wherein automatically reconfiguring the consolidated database instance using the configuration template to regenerate the configuration parameter comprises updating the configuration parameter by executing a statement in the configuration template.

6. The method of claim 5, further comprising updating another configuration parameter based on the updated configuration parameter, wherein another configuration parameter in the configuration template depends on the updated configuration parameter.

7. The method of claim 1, wherein the configuration template is maintained in memory allocated to the consolidated database instance.

8. The method of claim 1, wherein a consolidated database instance configuration is maintained in memory allocated to the consolidated database instance.

9. The method of claim 1, wherein the regenerated configuration parameter is applied to an open pluggable database, and the change detected comprising opening a second pluggable database.

10. A non-transitory computer readable medium having stored thereon a sequence of instructions which, when executed by a processor causes a set of acts comprising:
maintaining a consolidated database instance on a computing node in a cluster of computing nodes, wherein the consolidated database instance was configured using a configuration template having one or more configuration parameters that depend on a status parameter representing a current state of the computing node;
monitoring the computing node to detect a change at the computing node that corresponds to a configuration parameter in the configuration template; and
automatically reconfiguring, in response to detecting the change at the computing node that corresponds to the configuration template, the consolidated database instance using the configuration template to regenerate the configuration parameter.

11. The computer readable medium of claim 10, wherein the configuration template is used by a configuration management process to generate a consolidated database instance configuration.

12. The computer readable medium of claim 11, wherein the configuration template is used by a configuration management process to generate a pluggable database configuration.

13. The computer readable medium of claim 10, wherein monitoring the computing node to detect a change at the computing node that corresponds to the configuration template comprises parsing the configuration template to determine if a status parameter effected by the change corresponding to a configuration parameter that is in the configuration template.

14. The computer readable medium of claim 10, wherein automatically reconfiguring the consolidated database instance using the configuration template to regenerate the configuration parameter comprises updating the configuration parameter by executing a statement in the configuration template.

15. The computer readable medium of claim 14, wherein the set of acts further comprise updating another configuration parameter based on the updated configuration parameter, wherein another configuration parameter in the configuration template depends on the updated configuration parameter.

16. The computer readable medium of claim 10, wherein the configuration template is maintained in memory allocated to the consolidated database instance.

17. The computer readable medium of claim 10, wherein a consolidated database instance configuration is maintained in memory allocated to the consolidated database instance.

18. The computer readable medium of claim 10, wherein the regenerated configuration parameter is applied to an open pluggable database, and the change detected comprising opening a second pluggable database.

19. A computing system comprising:
a memory to hold a set of instructions;
a computer processor to execute the set of instructions, which when executed cause a set of acts comprising:
maintaining a consolidated database instance on a computing node in a cluster of computing nodes, wherein the consolidated database instance was configured using a configuration template having one or more configuration parameters that depend on a status parameter representing a current state of the computing node;
monitoring the computing node to detect a change at the computing node that corresponds to a configuration parameter in the configuration template; and
automatically reconfiguring, in response to detecting the change at the computing node that corresponds to the configuration template, the consolidated database instance using the configuration template to regenerate the configuration parameter.

20. The computing system of claim 19, wherein the configuration template is used by a configuration management process to generate a consolidated database instance configuration, and the configuration template is used by a configuration management process to generate a pluggable database configuration.

21. The computing system of claim 19, wherein monitoring the computing node to detect a change at the computing node that corresponds to the configuration template comprises parsing the configuration template to determine if a status parameter effected by the change corresponding to a configuration parameter that is in the configuration template.

22. The computing system of claim 19, wherein automatically reconfiguring the consolidated database instance using the configuration template to regenerate the configuration parameter comprises updating the configuration parameter by executing a statement in the configuration template, and the set of acts further comprise updating another configuration parameter based on the updated configuration parameter, wherein another configuration parameter in the configuration template depends on the updated configuration parameter.

23. The computing system of claim 19, wherein the configuration template and a consolidated database instance configuration is maintained in memory allocated to the consolidated database instance.

24. The computing system of claim 19, wherein the regenerated configuration parameter is applied to an open pluggable database, and the change detected comprising opening a second pluggable database.

* * * * *